(12) United States Patent
Messmer

(10) Patent No.: US 7,372,947 B1
(45) Date of Patent: May 13, 2008

(54) MESSAGE EXCHANGE AND METHOD FOR DISTRIBUTING MESSAGES IN TELEPHONE NETWORKS

(75) Inventor: Bruno T. Messmer, Thun (CH)

(73) Assignee: Swisscom Fixnet AG, Bern (CH)

( * ) Notice: Subject to any disclaimer, the term of this patent is extended or adjusted under 35 U.S.C. 154(b) by 0 days.

(21) Appl. No.: 09/787,741

(22) PCT Filed: Sep. 22, 1998

(86) PCT No.: PCT/CH98/00407

§ 371 (c)(1),
(2), (4) Date: Mar. 22, 2001

(87) PCT Pub. No.: WO00/18096

PCT Pub. Date: Mar. 30, 2000

(51) Int. Cl.
*H04M 1/64* (2006.01)
*H04M 15/00* (2006.01)

(52) U.S. Cl. .................... 379/88.01; 379/114.01

(58) Field of Classification Search ............ 379/88.01, 379/88.04, 88.22–88.25
See application file for complete search history.

(56) References Cited

U.S. PATENT DOCUMENTS

| | | | | |
|---|---|---|---|---|
| 4,856,066 A | * | 8/1989 | Lemelson | .................... 704/275 |
| 5,146,487 A | * | 9/1992 | Bergsman et al. | ............ 379/67 |
| 5,260,986 A | * | 11/1993 | Pershan | ....................... 455/413 |
| 5,333,180 A | | 7/1994 | Brown et al. | |
| 5,541,981 A | | 7/1996 | Lynn | |
| 5,699,412 A | | 12/1997 | Polcyn | |
| 5,717,738 A | | 2/1998 | Gammel | |
| 5,905,774 A | * | 5/1999 | Tatchell et al. | .......... 379/88.04 |
| 5,953,393 A | * | 9/1999 | Culbreth et al. | ......... 379/88.25 |
| 6,021,181 A | * | 2/2000 | Miner et al. | ............. 379/88.23 |
| 6,069,940 A | * | 5/2000 | Carleton et al. | ......... 379/88.04 |
| 6,075,844 A | * | 6/2000 | Goldberg et al. | ........ 379/88.17 |
| 6,088,428 A | * | 7/2000 | Trandal et al. | ........... 379/88.02 |
| 6,738,465 B1 | * | 5/2004 | Hu | ........................ 379/210.01 |

FOREIGN PATENT DOCUMENTS

| | | |
|---|---|---|
| EP | 0 177 405 A1 | 4/1986 |
| EP | 0 377 379 A1 | 7/1990 |
| EP | 0 106 575 A2 | 4/1994 |
| EP | 0844746 A2 | 5/1998 |
| WO | WO 9638969 A1 * | 12/1996 |
| WO | WO 97/28628 | 8/1997 |
| WO | WO 97/39569 | 10/1997 |

* cited by examiner

Primary Examiner—Ramnandan Singh
Assistant Examiner—Joseph T Phan
(74) *Attorney, Agent, or Firm*—Oblon, Spivak, McClelland, Maier & Neustadt, P.C.

(57) ABSTRACT

A voice-controlled message exchange apparatus and method for receiving spoken messages, from a plurality of subscribers in a public switched telephone network via the telephone network. The voice controlled message exchange is used for storing the received messages, together with an identification of the subscriber, who has transmitted the message, transmitting these messages to one or more subscribers or groups of subscribers in the public switched telephone network, and accepting and storing replies from subscribers, to whom the messages were transmitted, whereby the subscribers not only give voice-controlled messages and replies, but can also draw up and administrate lists with identifications of subscribers and groups of subscribers by voice control.

29 Claims, 2 Drawing Sheets

MESSAGE EXCHANGE AND METHOD FOR DISTRIBUTING MESSAGES IN TELEPHONE NETWORKS

This application is the national phase of international application PCT/CH98/00407 filed Sep. 22, 1999 which designated the U.S. and that application was published under PCT Article 21(2) in English

BACKGROUND OF THE INVENTION

Discussion of the Background

1. Field of the Invention

The present invention relates to a message exchange and a method for disseminating messages in telephone networks. In particular it relates to a message exchange and a method for receiving and storing spoken messages and for transmitting these messages to one or more subscribers, to whom the messages are addressed, in a public switched telephone network.

2. Description of the Related Art

Patent document EP 0 377 379 A1 describes an automatic telephone call device, which makes it possible to store messages and associated transmission profiles with the number of the addressee, date and point in time of the first message transmission, frequency of further transmission attempts as well as date and point in time of the last transmission attempt. The messages and transmission profiles can be entered from a distance via a telephone connection. If a plurality of users want to avail themselves of the services of a telephone call device described in EP 0 377 379 A1, they must have a device connected to the public switched telephone network since the telephone call device described in EP 0 377 379 A1 is not suitable for a plurality of users. Moreover, the telephone call device described in EP 0 377 379 A1 does not make it possible for a user to transmit a message to a plurality of addressees.

Patent document 0 177 405 A1 describes a radio telephone system for automobiles, which can be controlled by the user via a speech recognition module. In particular, messages can also be prepared, stored and transmitted, using stored telephone numbers, with the voice-controlled system described. However, the radio telephone system described in EP 0 177 405 is designed for just one user, and does not allow the user to transmit a message to a plurality of addressees.

U.S. Pat. No. 4,856,066 describes an electronic system and a method for preparing, storing and transmitting messages by means of spoken language. In particular, the patent describes the possibility of determining one or more addressees (groups) by means of spoken input. Routing instructions, or switching commands, are obtained through analysis of entered commands word-wise or by querying stored information on the basis of spoken commands. Stored messages, also given orally, can be transmitted at predetermined points in time. As in the documents described above, U.S. Pat. No. 4,856 066 also describes a system and method, which are not designed for a plurality of users.

U.S. Pat. No. 5,146,487 describes a method which permits a user of a telephone apparatus to prepare a message, determine an addressee associated therewith, and have the message transmitted to this addressee by pressing corresponding input keys under menu control. The method described in U.S. Pat. No. 5,146,487 is not designed to transmit a message to a plurality of addressees. Although the method described is suitable for receiving and storing messages from a plurality of users, no direct reply can be transmitted to the writer of a message.

SUMMARY OF THE INVENTION

It is an object of this invention to propose a new device and a new method for receiving, storing and transmitting spoken messages in telephone networks which, in particular, make it possible to receive messages from a plurality of subscribers of a public switched telephone network.

In particular, these objects are achieved by embodiments of a message exchange which is connected to the public switched telephone network, and comprises a receiving module which can receive spoken messages from a plurality of subscribers in the telephone network via the telephone network. The device also stores a received message, in each case, together with an automatically determined identification, for example, the call number of the subscriber who has placed the message. Also, this message exchange comprises a transmission module which can transmit stored messages to the respective subscribers by means of an automatic call. Such a message exchange has the advantage that the subscribers in the telephone network do not need any special, personal terminals to store messages and transmit them to one or more subscribers in the telephone network. Moreover, a message transmitted and stored to such a message exchange can be clearly assigned to the transmitting subscriber so that results about the outcome of the message transmission and/or replies of the receiving subscriber can be transmitted to the transmitting subscriber.

The message exchange comprises an address module in order to store a plurality of lists with subscriber identifications. These lists are assigned, in each case, to at least one subscriber in the telephone network and are administered by this subscriber with services of the address module. In an another embodiment, these lists can also contain access rights so that, access to a certain list can be permitted for all subscribers who are entered in the respective list.

In a different embodiment, subscriber identification in the list comprises the name and/or call number of a subscriber. Moreover, in the address module, at least certain subscriber identifications in a list of a subscriber are preferably combined into a group to which messages can be addressed. In a variant of the embodiment, certain subscriber identifications are stored as voice signals.

In a another embodiment, the message exchange comprises a speech recognition module so that subscribers can address messages to subscribers and/or groups of subscribers by designating the respective subscribers or groups of subscribers by means of spoken speech and transmitting them to the message exchange. The speech recognition module identifies, in the list of the respective subscribers, the subscribers and/or groups of subscribers designated by the subscriber. Moreover, in an embodiment variant, this speech recognition module makes it possible for subscribers to create and administer the lists by means of spoken language.

In different embodiment variants, the message exchange comprises at least one tariff table and/or one table with statistical information about the traffic load in the telephone network. The transmission module of the message exchange is able to transmit messages to the addressed subscribers at times having economical tariffs or at times of low traffic load.

The transmission module of the message exchange stores status information relating to the transmission of messages to subscribers, and can repeatedly transmit unsuccessfully transmitted messages.

The message exchange preferably comprises a reply module, which receives replies of a subscriber to whom messages were transmitted, and can store them for the respective subscriber who transmitted the message. In an embodiment variant, the reply module can receive, store and transmit to the addressed subscriber's messages, which can be addressed to a group of subscribers, as reply from a subscriber to whom messages were transmitted.

In another embodiment variant, certain messages are transmitted via the Internet, a corresponding gateway being switched in each case between the public switched telephone network and the Internet.

An embodiment of the present invention will be described in the following detailed description with reference to an example. The example of the embodiment is illustrated by the following attached figures:

DETAILED DESCRIPTION

Figure 1:
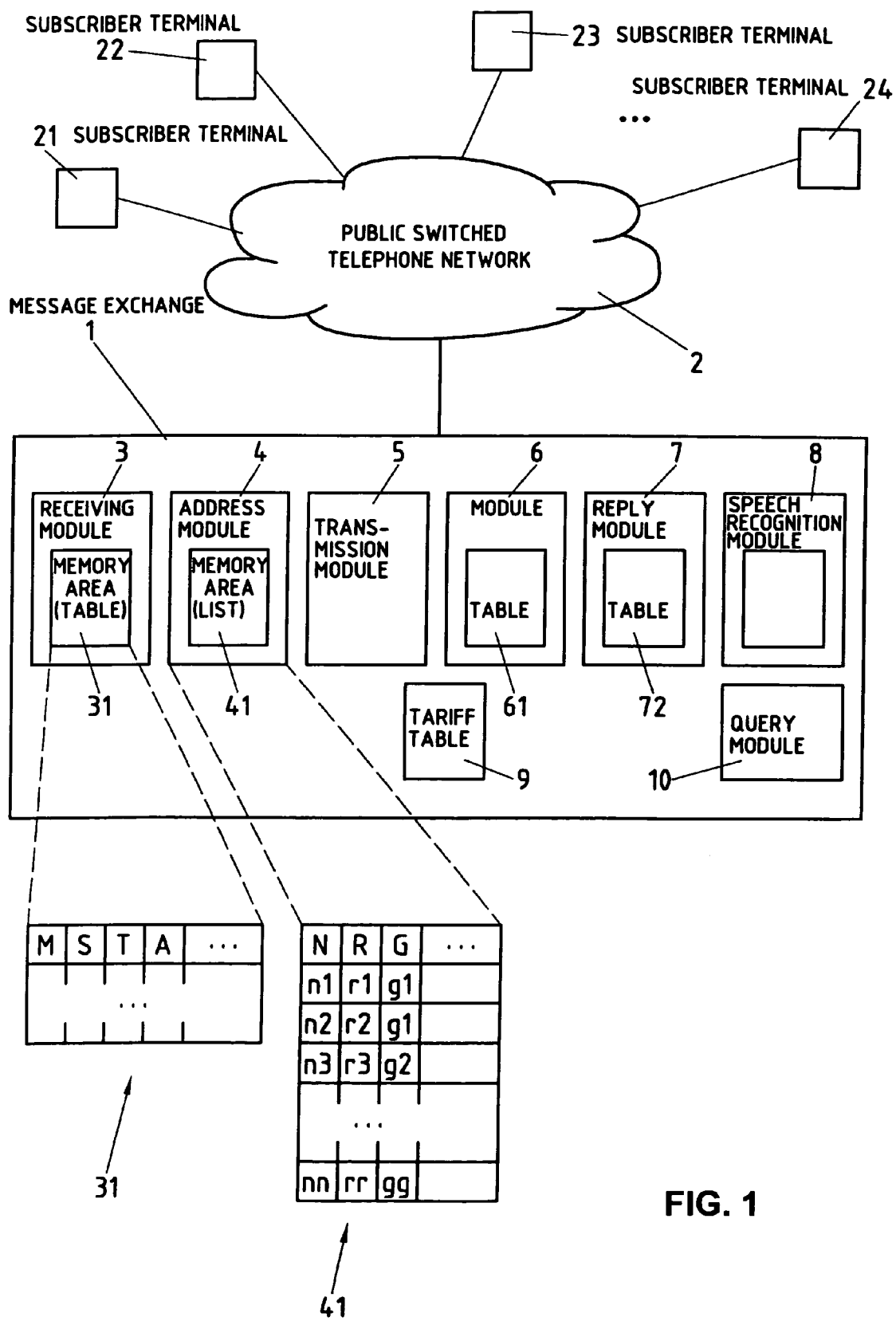
FIG. 1 shows a block diagram that illustrates schematically the structure of a message exchange, which is connected, to the public switched telephone network.

The reference numeral 2 in FIG. 1 refers to the public switched telephone network, to which a plurality of terminals 21-24 is connected. These terminals 21-24 represent the respective subscribers 21-24 in the public switched telephone network 2.

The reference numeral 1 refers to an embodiment of the message exchange according to the invention, which is connected to the public switched telephone network 2. The message exchange 1 comprises a plurality of modules on at least one server. For example a commercially available server having the necessary means to be connected to the public switched telephone network 2, or a commercially available telephone-switching center.

The message exchange 1 comprises a receiving module 3, which is a software module, i.e. a computer program, which is installed on the server of the message exchange 1 and has a memory area 31 assigned to it on one or more hard disk memories which are located on the server or in a drive connected to this server. A subscriber 21, who would like to have a spoken message transmitted to one or more other subscribers 22-24 in the public switched telephone network, calls the service number of the message exchange 1. The receiving module 3 of the message exchange 1 receives the call through conventional communications services, and automatically determines the identification of the calling subscriber 21, for example the call number. Afterwards, the receiving module 31 guides the calling participant 21 through the receiving procedure by means of spoken instructions. A spoken message and the identification of one or more subscribers to whom the message is supposed to be transmitted are thereby queried from the subscriber 21 and received. The receiving module 3 stores the message M in digital form, the automatically determined identification S (e.g., a call number) of the transmitting subscriber 21, as well as the identifications of the subscribers to whom the message is addressed, i.e. the addressees A of the message to be transmitted in the table 31, which is schematically illustrated in FIG. 1. As indicated in FIG. 1, the table 31 can also store other data elements, which are entered by the transmitting subscriber 21, for example a date and/or an indication of time when or before the message is supposed to be transmitted to the addressees. In FIG. 1, the table 31 has, in addition, a status field T, which will be described later.

There are different possible embodiments for the entering and storing of the identification of the subscribers to whom the message is addressed. In a first variant, by means of the dial keys of his terminal, for example a telephone, the transmitting subscriber can determine an addressee by entering the call number of the addressee. This call number can then be received by the receiving module 3, checked, and stored in the table 31. This variant has the advantage that it is simple to implement. However, it has the disadvantage that its use is inconvenient for the transmitting subscriber above all when this transmitting subscriber wishes to transmit the message to a plurality of subscribers.

In a second embodiment above, the transmitting subscriber determines the addressee by entering the name by means of the selection keys of his terminal or an identification number of a subscriber or a group of subscribers by means of selection keys of his terminal. In this variant, the typed-in name or the identification number is received by the receiving module 3 and compared, for example, with the entries in a personal list 41 of the transmitting subscriber 21, the administration of which will be described later. As can be learned from the table 41, illustrated schematically in FIG. 1, the value of the entered group G=g1 corresponds, for example, to two subscribers with the names N=n1 and N=n2, or respectively their call numbers R=r1 and R=r2, or the value of the entered name N=n3 corresponds to the call number R=r3. The receiving module 3 can correspondingly enter the call numbers r1 and r2, or respectively r3 in table 31, as the identification of the subscribers to whom the message is supposed to be transmitted, i.e. the addressee A. It is preferable to have this conversion of the typed-in values into the corresponding call numbers carried out directly by the receiving module because any possible discrepancies, for example missing entries, can be corrected by the transmitting subscriber 21. This second variant has the advantage over the first variant that the transmitting subscriber 21 has to type in fewer digits.

In a third embodiment, the transmitting subscriber 21 determines the addressees by transmitting the names thereof and/or the name of a group of subscribers by means of spoken language to the message exchange 1, where they are received by the receiving module 3. In a similar way as in the second variant, the receiving module 3 compares the received names and/or names of groups with the entries in the above-mentioned personal list 41 of the transmitting subscriber 21, and determines the call numbers belonging thereto. In addition, the services of a speech recognition module 8 of the message exchange 1 can be used thereby, which are based on commercially available software programs and which convert the received spoken names into text that is compared with the alphanumerically stored names and/or group names of the personal list 41. As an alternative, the receiving module 3 can have at its disposal programmed comparison algorithms by means of which the received spoken names are compared with the names or group names of the personal list 41, which are stored as voice signals in this case. It is preferable that group names, for example the value of g1, are converted directly at this point in time into the corresponding subscribers associated thereto, for example into the values of the call numbers r1 and r2.

There are different possibilities for a subscriber 21-24 to administer his personal list by means of the services of an address module 4, the address module 4 being, once again, a software module, which is installed on the server of the message exchange and which has a memory area 41 assigned to it, which is also accessible to the receiving module 3. In a similar way, as has been described for placing a message, a subscriber 21-24 can call the service number of the message exchange 1. Different service numbers can be thereby provided for placing a message and for administering personal address lists 41 or the various functions can be selected under a joint service number by means of a voice-controlled menu. The address module 4 of the message exchange 1 guides the interested subscriber 21-24, by means of spoken instructions, through the administrative procedure for his personal list 41 of subscribers to whom he wishes to have messages transmitted. Thereby received by the interested subscriber 21-24, and stored in the list 41, shown schematically in FIG. 1, depending upon the embodiment variant, are the names N and/or call numbers R of subscribers as well as groups of subscribers, which consist of a group name G and the associated participants N, R. In different variants, the values are typed in by the interested participant 21-24 by means of the keys of his terminal, or are transmitted by spoken language. Values which are transmitted by spoken language, for example the name of a participant or of a group of participants, can be stored as voice signals by the address module 4, or converted by means of the above-mentioned service of the voice recognition module 8 and stored as alphanumerical data.

In an additional or alternative embodiment, a subscriber 21-24 can administer his personal list by means of Internet services of the address module 4 to which he has access via the Internet (not shown). In this case, at least certain services of the address module 4 are available as programmed functions via a web server. The advantage of administration of the personal lists by means of Internet services is that an easy-to-use graphic user interface is thereby offered to the interested subscribers that is suitable for the input of alpha-numerical information and in particular for an efficient administration of the above-mentioned groups.

As is indicated in FIG. 1, other information can also be stored in the lists 41, in addition to the subscriber identifications, for example access rights by means of which writing and/or reading access to an entry in a personal list, or access to an entire personal list, can be permitted or respectively blocked for other subscribers, for example all subscribers who are contained in this list or only certain selected subscribers. These access rights can also be administered by means of services of the address module 4, in a similar way as described above.

In the message exchange 1, a message M, which was stored in the table 31 together with the identification S of the transmitting subscriber 21 and the identification A of one or more subscribers, is transmitted by a transmission module 5 to the addressee or addressees. The transmission module 5 is once again a software module, i.e. a computer program, which is installed on the server of the message exchange and which has access to at least one tariff table 9, which is filed on one or more hard disk memories located on the server of the message exchange 1 or in a drive connected to this server. The point in time of the transmission of a message is determined by the transmission module 5 taking into consideration the above-mentioned data and/or time indications as well as the tariff levels stored in the tariff table 9. In addition, or as an alternative, the point in time of the transmission can also be made dependent upon the load on the public switched telephone network 2, which is supplied to the transmission module 5 by a module 6 for determination of the traffic load. The module 6 can be designed in such a way that it determines the current load on the public switched telephone network 2 or in such a way that it has this load stored in a table 61 as a statistical value captured from an external process.

Figure 2:
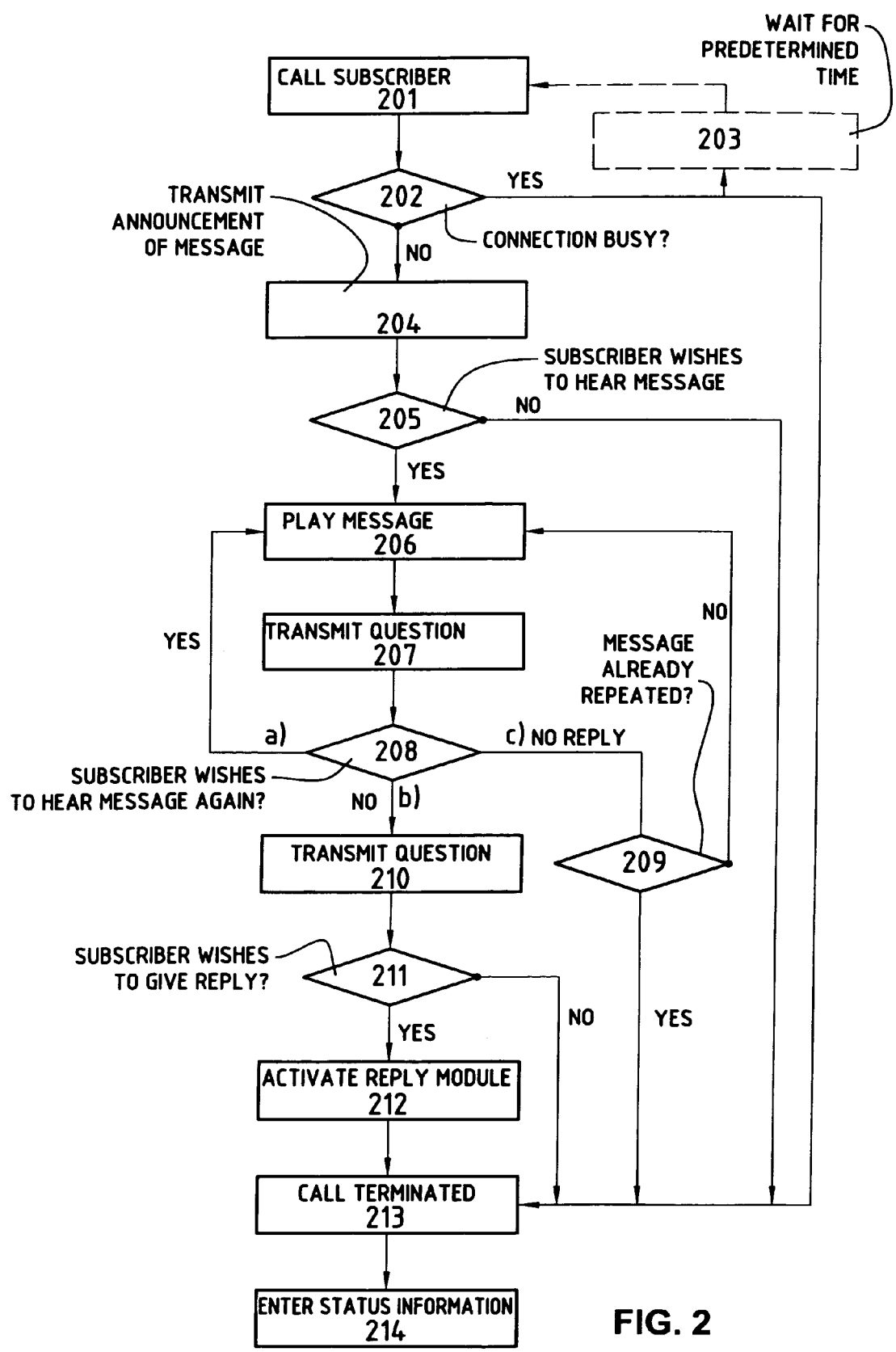
FIG. 2 shows a flow chart, which depicts the execution of a message transmission in a simplified way.

Shown simplified in a flow chart in FIG. 2 is the transmission of a message to an addressee with reference to an example. In step 201, with the aid of conventional communications services, the transmission module 5 of the message exchange 1 calls the call number of a subscriber 22-24, which is filed in the table 31, as described above, for the respective message.

In addition, or as an alternative, the transmission module 5 can also have access to the Internet, so that, starting at a certain tariff level, for example, for long-distance calls over great distances, the call to the subscriber can be established via the Internet, and the message transmitted via the Internet, with a corresponding gateway between the public switched telephone network and the Internet being used in each case.

In step 202, the transmission module 5 determines whether the connection to the terminal of the called subscriber is busy (occupied). If this is the case, the transmission module 5 continues in step 213, where the call is terminated. As will be described later, a corresponding status is then set and a new attempt to transmit the message is made at a later point in time. Alternatively, the transmission module 5 waits in step 203, as indicated in broken lines in FIG. 2, for a predetermined time, and then calls the respective subscriber again in step 201.

In step 204, when the connection to the called subscriber is not busy (unoccupied), the transmission module 5 transmits, a spoken announcement of the message, and asks the called subscriber whether he would like to hear the announced message. The corresponding text reads for example as follows: "This is a message from Mr. X. The message will be played to you in three seconds. Please answer with yes or no as to whether you would like to hear the message."

In step 205, after a predefined time span, the transmission module 5 checks the answer of the called subscriber to the question posed in step 204, for example with the aid of the above-mentioned speech recognition module 8. If the answer is no, the transmission module continues in step 213, where the call is terminated. Otherwise, if the answer is yes, or if no answer is given, for example because the call was received by an automatic telephone answering machine, the respective message M stored in table 31 is played to the called subscriber in step 206.

After the message has been played, the transmission module 5 transmits in step 207 the spoken question as to whether the called subscriber would like to hear the message again, for example:

"Please answer with yes or no as to whether you would like to hear the message again."

In step 208, the transmission module 5 checks the answer of the called subscriber, after a predefined time span, to the question posed in step 207, as mentioned above, with the aid of the speech recognition module 8. If the answer is yes, the transmission module 5 continues in step 206, and repeats the playing of the message. If the answer to the question in step 207 is no, the transmission module S continues in step 210. If no answer was given to the question in step 207, for example because the call was received by an automatic telephone answering machine, it is checked in step 209 whether the respective message has already been played again to the called subscriber by means of a flag provided for this purpose. If the message has already been played again to the called subscriber, the transmission module 5 continues in step 213, where the call is terminated. Otherwise, if the message has not yet been played again to the respective subscriber, the transmission module 5 sets the above-mentioned flag, and continues in step 206, where the playing of the message is repeated.

In step 210, the transmission module 5 transmits the spoken question to the called subscriber as to whether he would like to give a reply to the subscriber who transmitted the message, for example:

"Please answer with yes or no as to whether you would like to give a reply."

In step 211, the transmission module 5 checks, after a predefined time span, the answer of the called subscriber to the question posed in step 210, for example, as mentioned above, with the aid of the speech recognition module 8. If the answer is no, or if no answer is given, the transmission module 5 continues in step 213, where the call is terminated. Otherwise, if the answer is yes, the transmission module 5 activates, in step 212, the reply module, a software module, which receives a spoken reply from the called subscriber and stores it in a memory area accessible to it. The memory area is a table 72, which is filed on one or more hard disk memories located on the same server or in a drive connected to this server. In addition, the reply module 7 also sees to it that the stored answer is linked to the respective message and the respective called subscriber in that a respective indicator is entered in the table 31 for the respective message M.

In another embodiment, the reply module 7 can be designed in such a way that it offers the called subscriber the option, for example by means of spoken guidance, of transmitting a message, instead of a simple reply, to the transmitting subscriber, and optionally to other subscribers, for example to all or to selected subscribers to whom the original message was addressed, or also to other subscribers. For reasons of confidentiality, this embodiment can be implemented in such a way that this option can be blocked by the subscriber who placed the original message, for example, if this subscriber does not want to let the called subscriber know to whom the message was addressed, or the access to this option can be controlled by means of the above-mentioned access rights to the entries in a personal list 41. In principle, the reply module 7 can be achieved in such a way that it offers the called subscriber the functionality of the receiving module 3, as described above, in order to make it thereby possible for him to place a message himself in reply to the received message and to have it transmitted by the message exchange 1 to a group of subscribers.

As was already mentioned above, the transmission module 5 terminates the call to the called subscriber in step 213. Then, in step 214, the status information T corresponding to the outcome of the call, that means corresponding to the outcome of the transmission of the message M to the called subscriber, is entered in the table 31. The status information for a message to a particular subscriber contains, for example, information about the success or failure of the transmission of this message, about the number of transmission attempts, about the point in time of the last transmission, or about the availability of a reply from the called subscriber. As already mentioned, for messages which could not be successfully transmitted, another attempt is made at a later point in time, it being possible to limit the number of attempts to be repeated to a predefined number.

This status information as well as the received and stored replies can be made accessible to the respective transmitting subscriber by means of a query module 10. The query module 10 is again a software module, which is installed on the server of the message exchange, and which has access to the information in the table 31 and to the stored replies in the table 72. A subscriber 21-24 can call the service number of the message exchange 1 as described above, it being possible to provide for different service numbers for placing a message, for administering personal address lists 41, or for asking for status information and replies, or to select the different functions under a joint service number by means of a voice-controlled menu. The query module 10 of the message exchange 1 guides the interested subscriber 21-24, by means of spoken instructions, through the querying procedure for information about his placed messages. Similar to the way described for the administration of the personal lists, this query service could also be offered by means of Internet services via a web server.

The message exchange 1 described, as well as the method of receiving, storing and transmitting messages in telephone networks, are suitable for the most varied applications. For example, groups of people, e.g. a school class, a sports team, or in a completely general way an interest group, can thereby be informed about an upcoming event or a change in schedule without the caller having to carry out each individual call, and in particular repeated calls, owing to lines which are busy (occupied) by himself manually. With the described invention, it is also possible to carry out automatic polls in that a predefined group of called persons is asked questions which they can answer. It is, of course, also practical to have a message transmitted to individual persons who are hard to reach, without having to obtain and install a message device of one's own for this purpose.

It should also be mentioned here that, for certain applications, it can definitely be preferable for subscribers to be able to register themselves in public groups intended therefor; depending upon the application, such a public group can be accessible free or by payment only. The access to a public group can take place via Internet services intended therefor. All subscribers, who have registered in such a public group, will then receive a call with a message to which they can also reply, if need be.

Although this has not been mentioned so far, it is also possible with the present invention to transmit fax messages and/or other data instead of, or in addition to, the spoken messages.

An operator of a message exchange can offer interested subscribers the services described above at a flat rate tariff, or he can bill them according to the number of transmitted messages. Moreover it can also be advantageous to bill for the memory area used by the respective subscriber for storing his personal subscriber list and/or the placed messages.

In addition to the sale of complete message exchanges to interested operators, it can also be interesting to market the described software programs separately, for example by means of data carriers with programs stored thereon for control of computers, e.g. commercially available servers, according to the method described.

The invention claimed is:

1. A message exchange connected to a public switched telephone network including a plurality of subscribers, comprising:
   an address module configured to store a plurality of lists with subscriber identifications, each identification containing a subscriber identifier and a corresponding reference number, and each list being assigned to at least one of the subscribers;
   a receiving module configured to receive a spoken message from one of the subscribers in the telephone network via the telephone network, the one of the subscribers being a transmitting subscriber, and to store the spoken message with an identification of the transmitting subscriber;
   a speech recognition module configured to enable the transmitting subscriber to designate by means of spoken language at least one of the other subscribers as an addressee to whom the spoken message is addressed, and configured to enable the transmitting subscriber to edit the list assigned to the transmitting subscriber using speech recognition by means of spoken language;
   a transmission module configured to transmit the stored message by means of an automatic call to the addressee, and to inquire if a reply is to be sent from the addressee to the transmitting subscriber; and
   a reply module configured to receive and to store the reply from the addressee.

2. The message exchange according to claim 1, wherein the speech recognition module is further configured to enable the transmitting subscriber to create and administer at least one of the lists using speech recognition by means of spoken language.

3. The message exchange according to claim 1, wherein each subscriber identifier includes a name of one of the subscribers.

4. The message exchange according to claim 1, wherein each reference number includes a call number of one of the subscribers.

5. The message exchange according to claim 1, wherein at least one of the subscriber identifications is stored as a voice signal.

6. The message exchange according to claim 1, further comprising:
   at least one tariff table, wherein the transmission module refers to the at least one tariff table to transmit messages at times having economical tariffs.

7. The message exchange according to claim 1, further comprising:
   a table with statistical information on the traffic load in the telephone network, wherein the transmission module refers to the table to transmit messages at times of low traffic load.

8. The message exchange according to claim 1, wherein the reply module is configured to receive a reply from the addressee, and to store and transmit the reply to at least the transmitting subscriber.

9. The message exchange according claim 1, wherein at least one of the lists contains access rights.

10. A method of handling spoken messages in a public switched telephone network having a plurality of subscribers, the method comprising:
    storing a plurality of lists, with subscriber identifications, each identification containing a subscriber identifier and a corresponding reference number, in a message exchange connected to the telephone network, and each list being assigned to at least one of the subscribers;
    receiving in the message exchange a spoken message from one of the subscribers in the public switched telephone network via the public switched telephone network, wherein the one of the subscribers is a transmitting subscriber;
    storing the spoken message and an identification of the transmitting subscriber;
    designating to the message exchange at least one of the other subscribers as an addressee by means of spoken language;
    identifying an address of the addressee by use of a speech recognition module and at least one of the plurality of lists;
    editing the list assigned to the transmitting subscriber by the transmitting subscriber using speech recognition by means of spoken language;
    transmitting by means of an automatic call with the message exchange the spoken message to the addressee;
    inquiring the addressee to determine if a reply is to be sent to the transmitting subscriber; and
    receiving and storing, by means of the message exchange, the reply from the addressee when the reply is to be sent.

11. The method according to claim 10, wherein at least one of the subscriber identifications is stored as a voice signal.

12. The method according to claim 10, further comprising:
    storing status information concerning the transmission of the spoken message to the addressee; and
    retransmitting the spoken message if it is not successfully transmitted during a first attempt.

13. The method according to claim 10, further comprising:
    monitoring at least one tariff table; and
    transmitting the spoken message at an economical tariff time based on monitoring of the at least one tariff table.

14. The method according to claim 10, further comprising:
    storing statistical information on a traffic load in the telephone network in a table; and
    transmitting the spoken message at a time of low traffic load based on the stored statistical information.

15. The method according to claim 10, further comprising:
    transmitting the spoken message via the Internet.

16. The method according to claim 10, further comprising:
    receiving the reply from the addressee;
    storing the reply in the message exchange; and
    transmitting the reply to at least the transmitting subscriber.

17. The method according to claim 10, wherein the transmitting subscriber administers at least one of the lists by means of spoken language.

18. A computer readable medium, including computer executable instructions that cause a processor to execute the instructions to connect
    a message exchange to a telephone network having a plurality of subscribers, wherein when said computer is executable instructions are executed, the message exchange performs a method of:
    storing a plurality of lists with subscriber identifications, each identification containing a subscriber identifier and a corresponding reference number, and each list being assigned to at least one of the subscribers;

receiving a spoken message from one of the subscribers via the telephone network, wherein the one of the subscribers is a transmitting subscriber;

storing the spoken message and an identification of the transmitting subscriber;

storing an addressee subscriber identification associated with an addressee provided to the message exchange from the transmitting subscriber by means of spoken language, wherein the addressee is another one of the subscribers or a group of the subscribers;

editing a list, assigned to the transmitting subscriber, by the transmitting subscriber using speech recognition;

identifying an address of the addressee based on the addressee subscriber identification by use of a speech recognition module and at least one of the lists;

transmitting by means of an automatic call the spoken message to the addressee;

inquiring the addressee to determine if a reply is to be sent to the transmitting subscriber; and receiving and storing the reply from the addressee when the reply is to be sent.

19. The message exchange of claim 1, wherein the receiving module is further configured to determine an identification of the transmitting subscriber.

20. The message exchange of claim 1, wherein the receiving module is further configured to determine an address of the addressee based on the identification of the transmitting subscriber and on one of the plurality of lists corresponding to the transmitting subscriber.

21. The method of claim 10, further comprising:
determining an identification of the transmitting subscriber.

22. The method of claim 10, wherein the identifying further includes determining an address of the addressee based on the identification of the transmitting subscriber and on one of the plurality of lists corresponding to the transmitting subscriber.

23. The computer readable medium of claim 18, wherein when said computer executable instructions are executed, the message exchange further performs:
determining an identification of the transmitting subscriber.

24. The computer readable medium of claim 18, wherein when said computer executable instructions are executed, the message exchange further performs:
determining one of the plurality of lists that corresponds to the transmitting subscriber based on the identification of the transmitting subscriber.

25. The computer readable medium according to claim 18, wherein when said computer executable instructions are executed the message exchange further performs:
monitoring at least one tariff table, and
transmitting the spoken message at an economical tariff time based on monitoring of the at least one tariff table.

26. A message exchange according to claim 1, wherein the address module is further configured to be accessed via the internet to edit the plurality of lists.

27. A message exchange according to claim 1, wherein the reply module is configured to receive the reply from the addressee, said reply being sent by the addressee by means of spoken guidance.

28. A method of handling spoken messages according to claim 10, wherein the reply from the addressee is sent by the addressee by means of spoken guidance.

29. The computer readable medium according to claim 18, wherein the reply from the addressee is sent by the addressee by means of spoken guidance.

* * * * *